Figure 1:
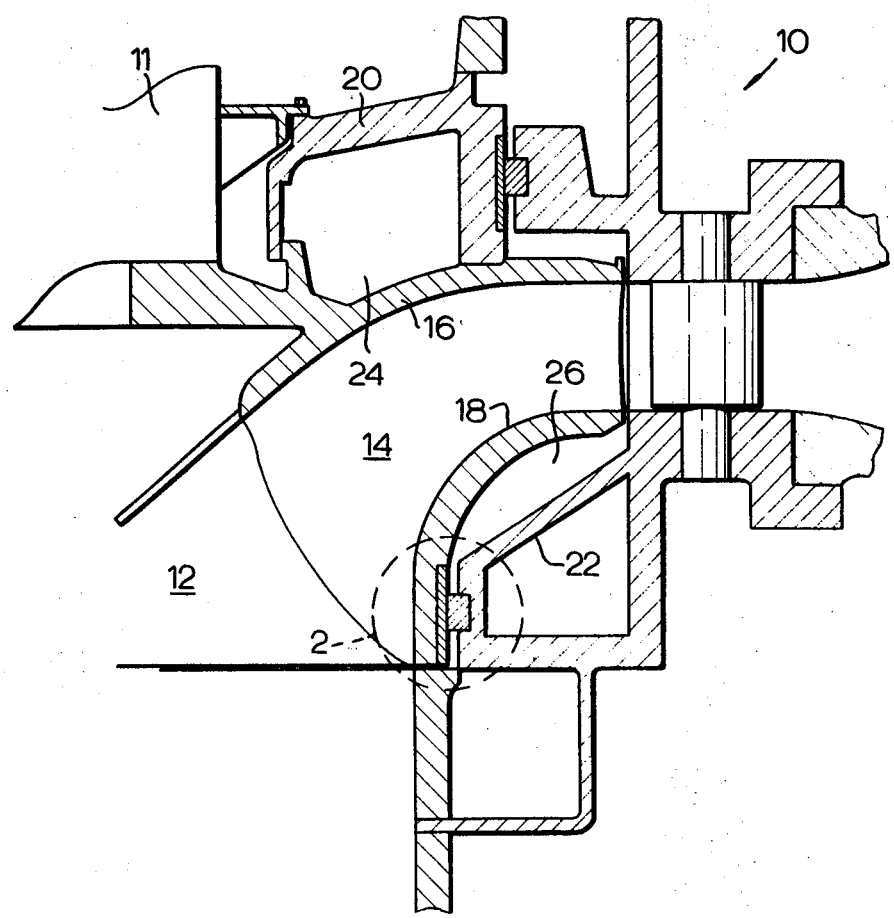

United States Patent

[11] 3,612,713

[72] Inventors Douglas Walter Eggins
Scarborough, Ontario;
Robert Stanley Sproule, Montreal, Quebec;
Fedodor Kanger, Montreal, Quebec,
Canada; Peter William Runstadler, Jr.,
Hanover, N.H.
[21] Appl. No. 887,066
[22] Filed Dec. 22, 1969
[45] Patented Oct. 12, 1971
[73] Assignee Dominion Engineering Works, Limited
Lachine, Quebec, Canada
[32] Priority Dec. 23, 1968
[33] Canada
[31] 38,485

[54] TWO-PHASE SEAL FOR ROTARY FLUID MACHINES
6 Claims, 3 Drawing Figs.
[52] U.S. Cl. .................................................. 415/110, 62/66
[51] Int. Cl. .................................................. F01d 11/00
[50] Field of Search .................................................. 415/110

[56] References Cited
UNITED STATES PATENTS
| 3,174,719 | 3/1965 | Sproule et al. | 415/110 |
| 3,174,720 | 3/1965 | Sproule | 415/110 |
| 3,239,193 | 3/1966 | Kerensky | 415/110 |

*Primary Examiner*—C. J. Husar
*Attorneys*—Raymond A. Eckersley, Frank L. Neuhauser, Oscar B. Waddell and Joseph B. Forman

ABSTRACT: A large rotary hydraulic machine such as a pump, pump-turbine, or turbine of the Francis type, having the runner provided with a skirt shroud, includes an annular ice seal surrounding the runner skirt to limit water leakage there past. A temporary seal assists in establishing stabilized operation of the ice seal.

INVENTOR.
ROBERT S. SPROULE.
FEODOR KANGER.
BY DOUGLAS W. EGGINS.
PETER W. RUNSTADLER, JR.

Ra Eckersley
AGENT

TWO-PHASE SEAL FOR ROTARY FLUID MACHINES

This invention is directed to a method of sealing a hydraulic turbomachine such as a Francis turbine, centrifugal pump or pump-turbine and to an apparatus for carrying out the method.

In the operation of power producing machines such as turbines and pump turbines the efficiency of operation is tied closely to the efficiency and effectiveness of the runner seals which prevent wastage of water in bypass flow around the runner of the machine. The economics of seal efficiency are such that an improvement of 1 percent in the operational efficiency of the total machine may have a cash value over the life of the machine equal to a substantial portion of the initial capital cost of the machine. The present invention is directed to a runner-seal system utilizing an ice seal to provide inherent self regulation of seal clearances.

The invention thus provides a method of operating a hydraulic turbomachine having a bladed runner and at least one annular shroud member attached to the runner blades having an annular surface remote from the blades forming with the stationary casing of the machine an annular shroud space having a high-pressure annular entry adjacent the high-pressure edge of the shroud member and a low-pressure annular entry emote therefrom, including the steps of admitting water to the shroud space, freezing the water at an axially localized zone to form an annular ice barrier in sealing proximity to a portion of the shroud remote from the blades, and maintaining the barrier in a refrigerated condition whereby a minimal radial clearance between the ice carrier and an adjacent moving part f the runner is maintained.

It will be evident that the formation of the ice barrier is most easily carried out when the runner is at a standstill with no water flowing therethrough. However this is not always practicable or desirable, and the present invention therefore also provides the additional step of introducing a nonpermanent barrier during operation of the machine to limit the flow of liquid through the shroud space, whereby the formation of he ice barrier is facilitated.

The invention further provides apparatus specially adapted to carry out the steps of the method comprising a hydraulic turbomachine having a bladed runner with plurality of blades attached to at least one annular shroud member to form a plurality of working flow paths for water flowing through the blades from adjacent stationary portions of the machine, the shroud forming with adjoining portions of the adjacent stationary housing an annular leakage path remote from said blades in parallel flow relation with the working flow paths, and an annular seal structure in blocking relation with the leakage path having ice-barrier-forming means extending from the housing towards the runner    rovide a barrier of ice having restricted clearance from a portion of the shroud whereby leakage of working liquid through the leakage path is substantially obstructed.

In addition, the invention provides nonpermanent seal means in the leakage path movable into flow-blocking relation with leakage water flowing therethrough, to minimize the quantity of flow past the forming ice barrier. An alternative arrangement is contemplated which involves the provision of a pressurizing arrangement such as a pump to substantially prevent the down flow of leakage water past the forming ice barrier.

One embodiment of the nonpermanent seal comprises means for introducing ice or other low-friction material such as Teflon in cube and chip form temporarily into the working space. An alternative embodiment of nonpermanent seal comprises a retractable seal normally held out of sealing relation with the runner and movable into sealing relation therewith on a short term basis during the establishment of the regular ice seal.

The introduction of an additive such as woodpulp to reinforce the ice barrier is contemplated.

Figure 2:
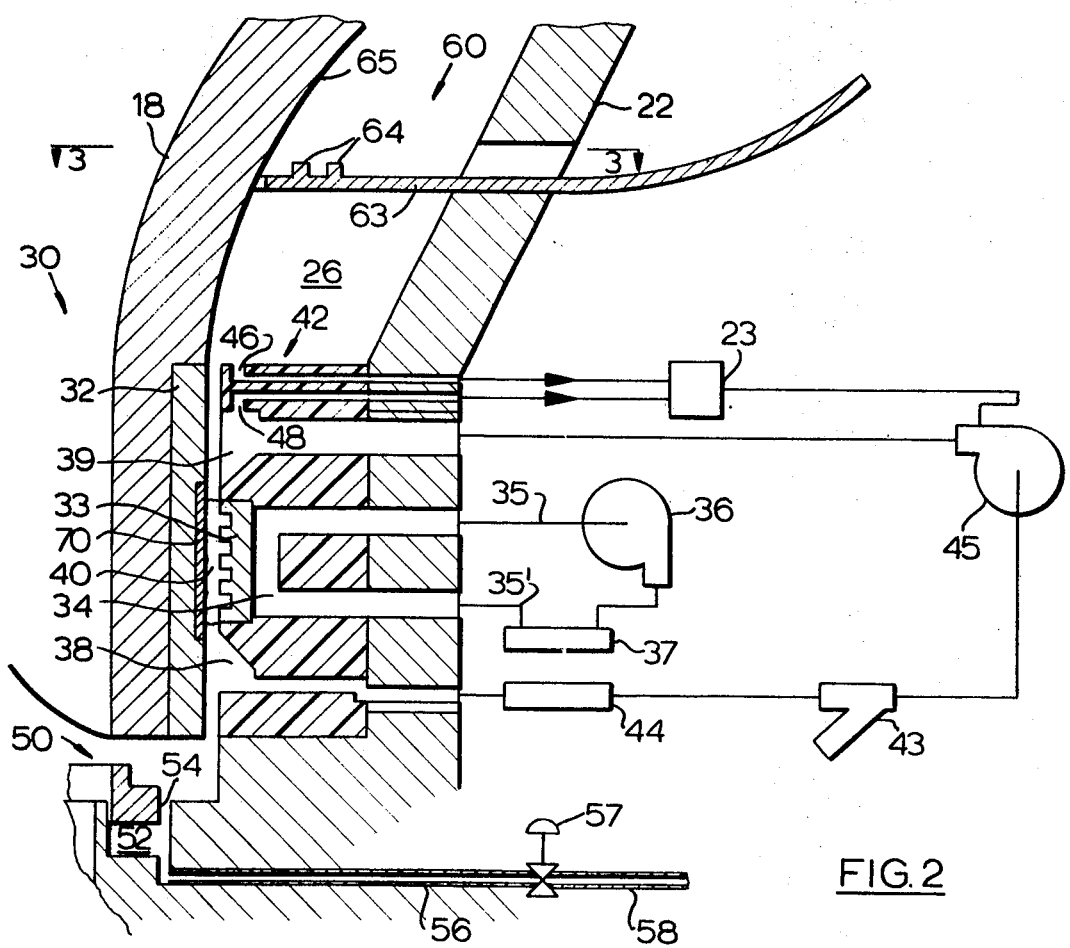
Figure 3:
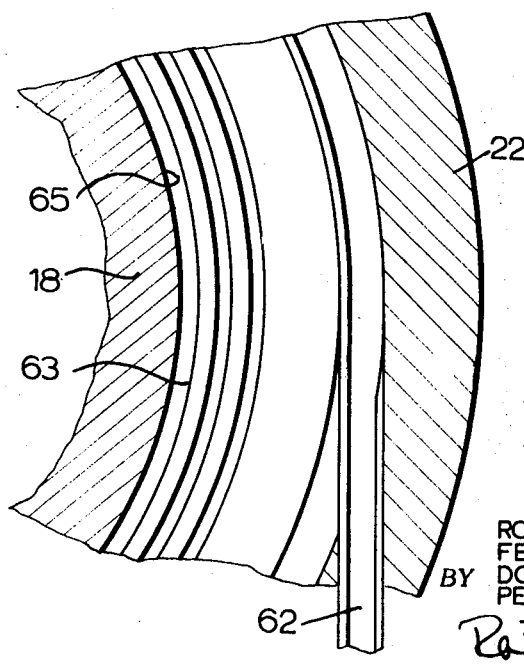

Certain embodiments of the present invention are described, reference being had to the accompanying drawings wherein:

FIG. 1 is a cross-sectional view of a turbine of the Francis type embodying the invention;
FIG. 2 is an enlargement of the portion 2 of FIG. 1;
FIG. 3 is a portion of a section on the line 3—3 of FIG. 2.

Referring first to FIG. 1 the turbine or pump-turbine of the Francis type 10 has a main shaft 11 supporting a runner 12 thereon, having blades 14, an upper or crown shroud 16 and a lower shroud or skirt 18. The shroud 16 together with the inner head cover 20, and the shroud 18 together with the lower portion 22 of the machine housing combine to form a crown shroud space 24 and a skirt shroud space 26, respectively.

It is the provision of effective seals to minimize parallel leakage flow through at least one of the shroud spaces 24, 26 to which the present invention is directed.

Turning to FIG. 2, this shows the ice seal assembly 30, a temporary seal arrangement 50 adjacent the lower edge of the skirt 18, and a further alternative or additional temporary seal arrangement 60 within the shroud space 26.

Dealing first with the temporary seals 50, 60 the seal 50 comprises an annular chamber 52 in facing relation with the bottom of the runner skirt 18, having an annular piston-type seal 54 located therein, and a fluid supply pipe 56 selectively connected by way of a two-way control valve 57 and line 58 to a source of fluid pressure or to a low-pressure zone, whereby on admission of pressurized fluid the seal member 54 may be raised up into sealing relation with the skirt 18 of the runner to substantially prevent the passage of leakage flow through the zone of the ice seal 30, or retracted from sealing contact on connection of the chamber 52 with the low-pressure zone.

The alternative or additional temporary seal 60, shown in FIG. 3, comprises an access chute 62 extending through the wall portion 22 of the turbine housing to provide access to a tray member 63 having spiral track ribs 64 for the guidance of ice cubes or other forms of fragmented ice or other suitable low-friction material into sealing and contacting relation with the inner face 65 of the skirt 18. A trap seal (not shown) is provided to seal off the access 62 through the wall 22.

Referring in detail to the ice seal assembly 30, while this is illustrated in relation to the skirt or band shroud 18, it will be understood that a similar embodiment may be provided in cooperation with the crown shroud 16, in relation to the shroud space 24.

The seal 30 includes a insulating insert 32 in the skirt 18 bearing a hand metal wearing ring 70, and an annular-insulating assembly 42 in facing relation therewith defining a plurality of flow passages as detailed below.

An annular metallic plate 33 of copper or other suitable thermally conductive material is mounted on the radially inner face of the assembly 42 to enclose a refrigeration gallery 34 which connects through the wall 22 by way of pipes 35, 35' with a refrigerant circuit having a pump 36 and a refrigerator 37. By selection of the shape and form of the plate 33 the rates of heat transfer and the shape of the ice barrier 40 thus formed may be selectively controlled.

Annular water circulation galleries 38, 39 provide for the downward circulation of chilled water over the ice face 40 which builds up on the copper plate 33. The chilled water may be filtered at 43, to remove any undesirable foreign matter. The water may be refrigerated at the refrigerator 44, and passes by way of pump 45 back to the inlet gallery 39 for recirculation over the ice face 40.

The ingress of water into the seal from above is limited by localized circulation of chilled water by pump 45 to minimize the ingress of warmer water to the face of the ice seal 40. The operation of the pump 45 may be controlled by temperature of flow detectors at the intakes 46, 48.

The radial clearances provided between running and stationary components are held to a minimum compatible with the likelihood of destructive damage due to rubbing. In the case of the ice seal, it is contemplated that the degree of ice buildup is such that a clearance of only a few thousandths of an inch in the form of a high-sheer water film is obtained. The rate of ice buildup and the configuration provided is controlled at least in part by regulation of the refrigerators 37 and 44. The actual seal clearance is provided by intermittent light-rubbing between the sealing face of the ice seal and the adjoining face of the wearing ring 70, formed of wear resistant material such as hard metal.

It is contemplated that a refrigerant circuit in the form of annular tubing coils may be substituted for the gallery arrangement illustrated.

What I claim as new and desire to secure by Letters Patent of the United States is:

1. A hydraulic turbomachine having a bladed runner with a plurality of blades attached to at least one annular shroud member to form a plurality of working flow paths for water flowing through the blades from adjacent stationary portions of the machine, said shroud with adjoining portions of the adjacent stationary housing forming an annular leakage path remote from said blades in parallel flow relation with said working flow paths, and an annular seal structure in blocking relation with said leakage path having ice-barrier-forming means extending from the housing towards the runner to provide a barrier of ice having restricted clearance from a portion of said shroud whereby leakage of working liquid through said leakage path is substantially obstructed.

2. The machine as claimed in claim 1 including water recirculation means for flowing chilled water over the surface of said ice barrier.

3. The machine as claimed in claim 2 including refrigeration means for chilling recirculation water.

4. The turbomachine as claimed in claim 1 including non-permanent seal means in said leakage path movable into flow-blocking relation with leakage water flowing therepast, to minimize the quantity of flow past said ice barrier.

5. The turbomachine as claimed in claim 1 including non-permanent seal means having means for supporting a plurality of discrete portions of ice as a substantially sealing annulus in contact with said shroud, within said leakage path.

6. The turbomachine as claimed in claim 1 including non-permanent seal means having an annular seal retractably mounted in said housing for movement towards a portion of said runner shroud for substantial sealing engagement therewith, whereby the passage of leakage water past said ice-barrier-forming means may be substantially precluded.